March 15, 1932.  T. W. ADAIR  1,849,216
PIPE HOLDER
Filed Sept. 25, 1928  2 Sheets-Sheet 2
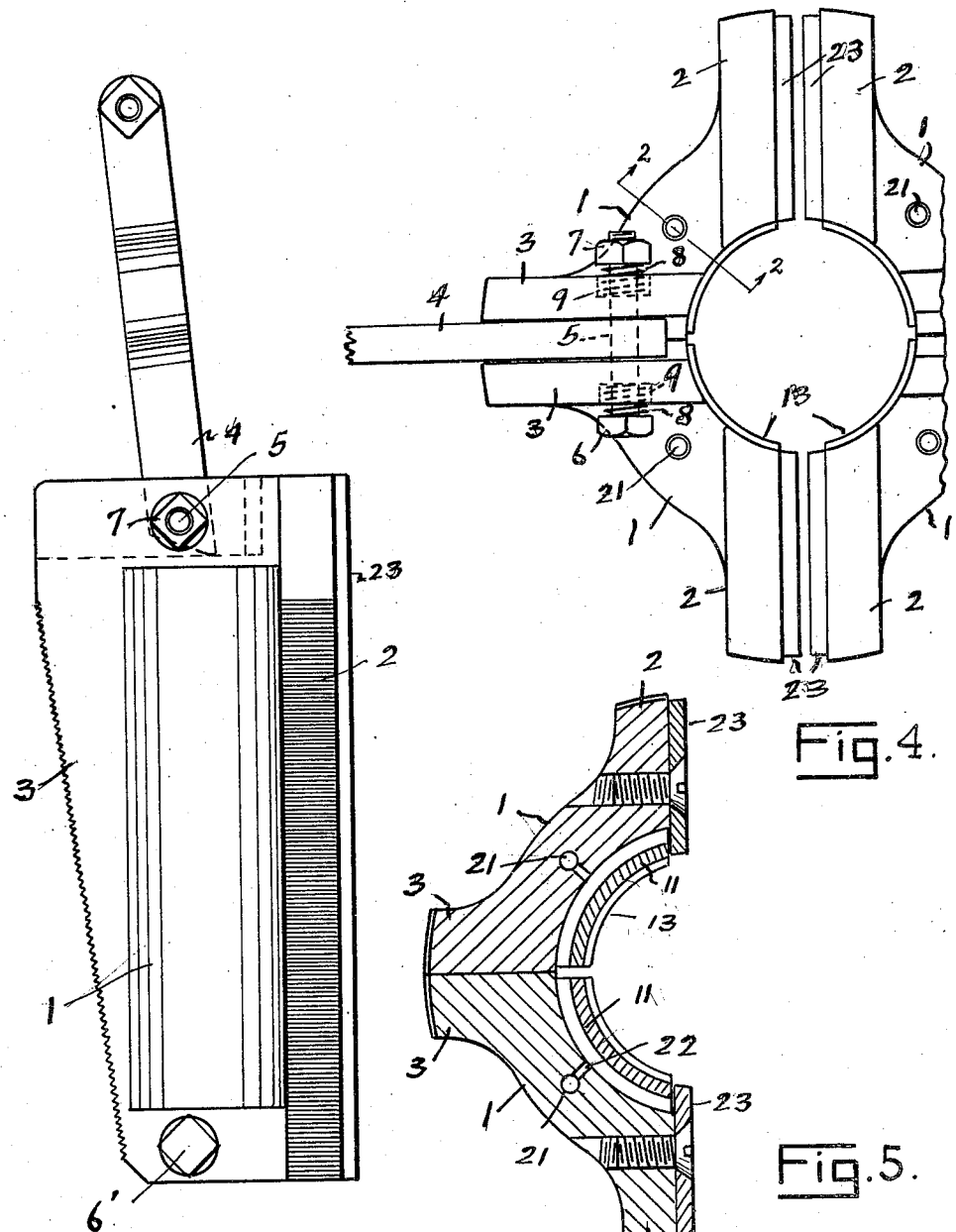

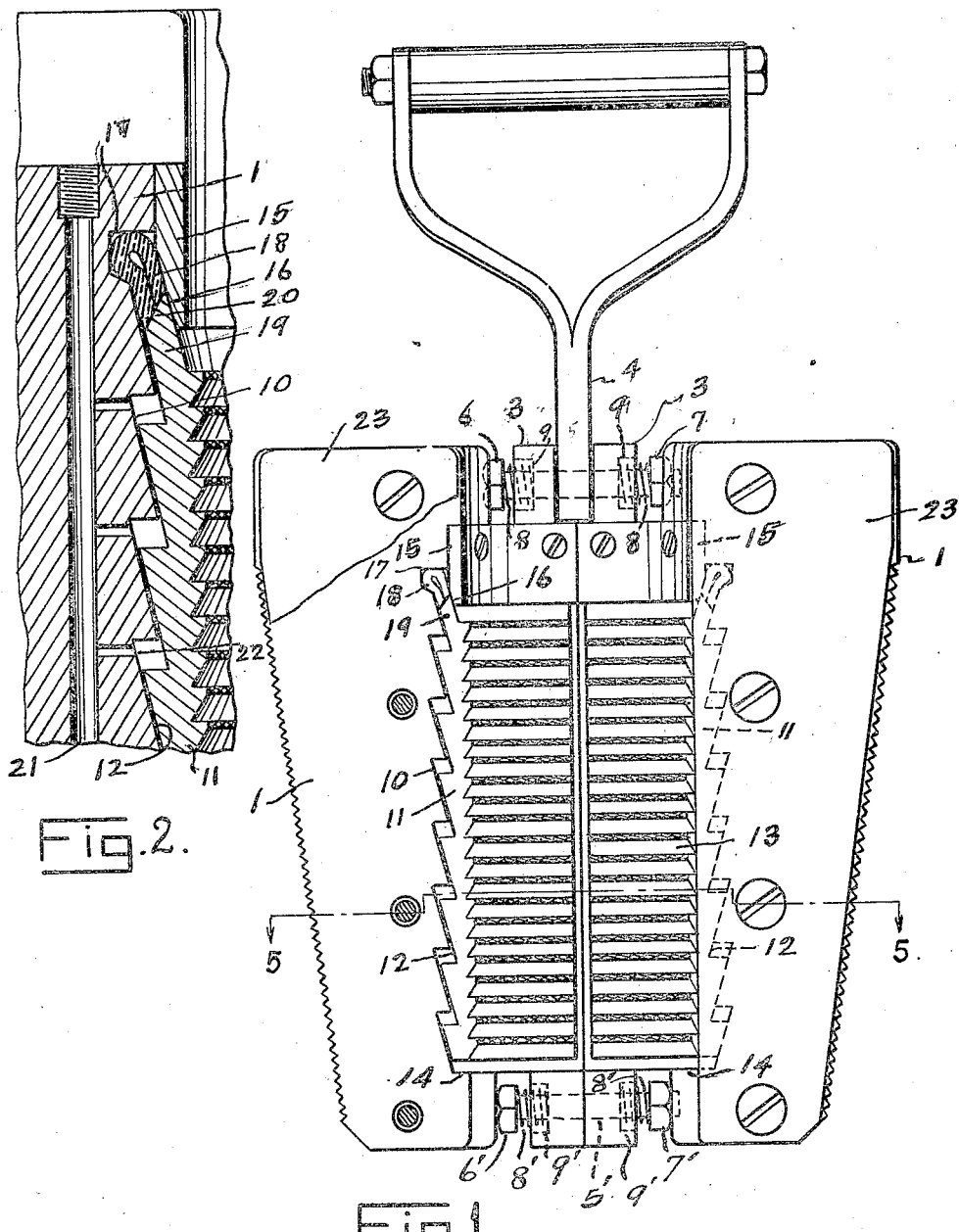

Patented Mar. 15, 1932

1,849,216

UNITED STATES PATENT OFFICE

THOMAS W. ADAIR, OF HOUSTON, TEXAS, ASSIGNOR OF ONE-HALF TO J. P. ARNOLD, OF HOUSTON, TEXAS

PIPE HOLDER

Application filed September 25, 1928. Serial No. 308,281.

This invention relates to new and useful improvements in the pipe holder.

One object of the invention is to provide a pipe holder of the character described adapted to be seated in the downwardly converging seat of a rotary table or casing head and provided for the purpose of effectively gripping and holding a pipe suspended in a well bore and including engaging jaws which will readily release the pipe, upon upward movement of said pipe.

Another object of the invention is to provide a pipe holder of the character described which embodies a spider formed of two independent sections, each section comprising two segments yieldably connected together, to the end that the sections of the spider will be flexible, so that the spider will readily conform to the shape of and seat in the downwardly converging seat of the rotary table, or casing head.

A still further feature of the invention resides in the provision of a holder having slip jaws mounted in the respective sections of the spider and having external bearing faces which cooperate with corresponding internal bearing faces of said spider, said bearing faces having such pitch relative to the pitch of the seat, in the rotary table or casing head, that said jaws will be wedged securely about the pipe held thereby, but will not stick and will readily release the pipe when the same is moved upwardly.

A still further feature of the invention resides in the provision of means for lubricating said bearing faces to prevent them from sticking in the spider, so that they will readily release said pipe.

With the above and other objects in view, the invention has particular operation and novel features of construction, operation and arrangement of parts, an example of which is given in this specification and illustrated in the accompanying drawings wherein:—

Figure 1 shows an inside view of one section of the holder,

Figure 2 shows a sectional view taken on the line 2—2 of Figure 4,

Figure 3 shows a side view of said section,

Figure 4 shows a fragmentary plan view of the holder, and

Figure 5 shows a transverse sectional view on the line 5—5 of Figure 1.

Referring now more particularly to the drawings wherein like numerals of reference designate similar parts in each of the figures, the numeral 1 designates adjacent segments of one section of the spider. The margins of each segment have the vertical external ribs or flanges, 2, 3, respectively, the ribs 3 having the confronting flat faces which abut, as shown in Figure 5. The upper ends of the ribs 3 of each section are spaced apart and the lower end of the handle 4 is fitted between said spaced ends. A bolt 5 is fitted through aligned bearings in the upper ends of the ribs 3 and through a bearing in said end of the handle as well, said bolt having a head 6 at one end and a nut 7 on the other end, and interposed between said head and nut and the outer sides of the corresponding ribs 3, and surrounding said bolt, are the coil spring 8, 8 whose inner ends are seated in the sockets 9 in the outer sides of said ribs as shown in Figure 4. The complete spider is thus formed of two opposing sections, each having a handle 4, through which said sections may be handled independently.

At the lower ends of the ribs 3 are the transverse bolts 5' which are fitted through aligned bearings in said ribs, each bolt having a head 6' at one end and a nut 7' on the other end and the coil springs 8' surround each bolt and are interposed between said head and nut respectively and the opposing ribs 3 and are fitted in the sockets 9' in said ribs.

The spider is thus made flexible so that it will readily conform itself to the shape of the downwardly converging seat in which the holder is to be seated.

The outer edges of the ribs 2 and 3 converge downwardly to conform to the shape of and fit within said seat and are transversely milled as shown so that in case they do not perfectly fit in said seat they will soon wear to the contour of the seat to form a nice fit.

The inner side of each segment has a plurality of arcuate bearing faces 10 one above the other as more accurately shown in Figures 1 and 2. Mounted on the inner side of each segment is a pipe engaging jaw 11. These jaws have the external arcuate bearing faces 12 which work against the opposing bearing faces 10 of the corresponding segment and are correspondingly pitched. The bearing faces 10 of the respective segments converge downwardly at less pitch than the external pitch of the outer surfaces, or faces, of the respective ribs 2, 3. The inner faces of the jaws 11 have the transverse teeth 13 which are arcuate to conform to and engage around the pipe to be held and these teeth may be serrated as shown in Figures 1 and 2.

When pipe holders now commonly employed are used they wedge between the table, or casing head, seat and the pipe and often stick so that when the pipe is lifted up or elevated the slips will not release with the result that the rotary table is often lifted off of its base. With the present type of pipe holder when the pipe is lifted the jaws 11 will move upwardly and outwardly along the faces 10 and readily release the pipe, this being due to the fact that the faces 10 are given such pitch that the jaws will not wedge between the pipe and the spider segments so tightly as to stick and not release the pipe.

The lower end of each segment is extended inwardly forming an abutment 14 which limits the downwardly movement of the jaw relative to the corresponding segment.

At the upper end of each segment there is secured an internal arcuate keeper plate 15 whose lower end is outwardly beveled as at 16 and behind each keeper plate there is an arcuate groove 17 cut in the segment and in which is fitted a yieldable gasket 18 preferably formed of rubber against which the upwardly extended end 19 of each jaw abuts. The abutting upper face 20 of this extension 19 is inwardly beveled so as to wedge between the gasket and the corresponding keeper plate and this operates to hold the jaw inwardly so that its faces 12 will be slightly spaced from the corresponding faces 10 when the weight of the pipe is not on said jaws. Each segment has a lubricating channel 21 extending downwardly therethrough which has the branches 22 terminating on the faces 10 and through which a lubricant may be fed to these faces which will trickle down between the segment faces and the jaw faces and keep them lubricated as a further precaution against the sticking of the jaws when it is desired to elevate the pipe through the holder.

The confronting faces of the respective sections of the spider have the face plates 23, secured thereon whose inner margins project inwardly and form abutments to retain the jaws in place when the segments of the respective sections are assembled together.

While I have shown what I now consider to be the preferred form of the invention it is obvious that mechanical changes may be made therein and equivalents substituted for the parts shown and I reserve the right to make such mechanical changes and substitutions as may be comprehended within the principle of the invention.

What I claim is:—

1. A pipe holder formed of sections, each section comprising adjacent segments, means including resilient elements for connecting said segments yieldingly together, the inner side of each segment having a plurality of bearing faces in stepped relation, a pipe engaging jaw on the inner side of each segment having external bearing faces which cooperate with the bearing faces of the corresponding segment.

2. A pipe holder formed of sections, each section having adjacent segments, a device for connecting said adjacent segments together, said connecting device normally holding the connected segments in a fixed relation and including a resilient element which permits the connected segments to move out of said relation, each segment having arcuate inside bearing faces arranged one above the other, the bearing faces of the respective segments converging downwardly, relative to each other, a pipe engaging jaw on the inside of each segment, each jaw having external bearing faces which work against the bearing faces of the corresponding segment.

3. A pipe holder formed of sections, each section having adjacent segments, means for connecting said adjacent segments together, each segment having arcuate inside bearing faces arranged one above the other, the bearing faces of the respective segments converging downwardly, relative to each other, a pipe engaging jaw on the inside of each segment, means preventing rotary movement of a jaw relative to its segment, each jaw having external bearing faces which work against the bearing faces of the corresponding segment, each segment having a lubricant channel which terminates on its respective bearing faces.

4. A pipe holder formed of sections, each section comprising adjacent segments, means for connecting said segments yieldingly together, the inner side of each segment having a plurality of bearing faces in stepped relation, a pipe engaging jaw on the inner side of each segment having external bearing faces which cooperate with the bearing faces of the corresponding segment to effect the radial movement of the jaw when said jaw and the corresponding segment are relatively moved longitudinally, each segment having an arcuate inside seat, a yieldable element in said seat against which the upper end of the corresponding jaw abuts.

5. A pipe holder formed of sections, each section comprising adjacent segments, means for connecting said segments yieldingly together, the inner side of each segment having a plurality of bearing faces in stepped relation, a pipe engaging jaw on the inner side of each segment having external bearing faces which cooperate with the bearing faces of the corresponding segment, to permit radial movement of each jaw relative to its segment, face plates on the confronting faces of the respective sections whose inner margins form retaining abutments for the corresponding jaws.

6. A pipe holder formed of sections, each section having adjacent segments, means including resilient abutments for connecting said adjacent segments together, each segment having arcuate inside bearing faces arranged one above the other, the bearing faces of the respective segments converging downwardly, relative to each other, a pipe engaging jaw on the inside of each segment, each jaw having external bearing faces which work against the bearing faces of the corresponding segment.

7. In a pipe holder, a section formed of segments having external marginal flanges whose outer surfaces taper downwardly, yieldable means connecting the adjacent flanges of the segments together, the inner side of each segment having bearing faces in stepped relation, each face being pitched, relative to the axis of the holder, at an angle greater than the pitch of said flange surfaces, relative to said axis, a jaw on the inner side of each segment whose outer surface has bearing faces which work against the bearing faces of said segment.

8. In a pipe holder a spider section formed of segments having outwardly turned marginal flanges, a bolt fitted through the adjacent flanges of said segments, end abutments on said bolt, coil springs around the bolt between the respective adjacent flanges and the opposing abutments.

9. In a pipe holder a spider section formed of segments having outwardly turned marginal flanges, a bolt fitted through the adjacent flanges of said segments, end abutments on said bolt, coil springs around the bolt between the respective adjacent flanges and the opposing abutments, and a pipe engaging jaw on the inner side of each segment.

10. In a pipe holder a spider segment having outwardly extending marginal flanges whose outer edges are downward tapered and roughened, a pipe engaging jaw on the inner face of said segment upper and lower retaining means on the segment engageable with the corresponding ends of the jaw and a cushion member against which one end of the jaw abuts.

11. In a pipe holder a spider segment, arcuate in horizontal cross sectional contour, an arcuate inwardly extending shoulder at the lower end of the segment, an arcuate inside keeper plate at the upper end of the segment whose lower margin is spaced from the segment, a yieldable element between said spaced margin and the segment, a pipe engaging jaw on the inside of the segment whose upper end is retained by said keeper plate and is outwardly beveled and abuts said yieldable element.

12. In a pipe holder, a spider section formed of adjacent segments, means for connecting said segments together and yieldable cushioning means associated with the connecting means and acting against the connected segments.

13. In a pipe holder a section formed of adjacent segments, means connecting said segments together, and permitting a limited movement of said segments toward and from each other, and yieldable means acting to resist such movement in one direction.

14. In a pipe holder a section formed of adjacent segments, a tie member connecting the segments together and allowing a limited relative movement of said segments, resilient means normally tending to prevent such relative movement.

In testimony whereof I have signed my name to this specification.

THOMAS W. ADAIR.